March 17, 1970
JAMES E. WEBB
ADMINISTRATOR OF THE NATIONAL AERONAUTICS
AND SPACE ADMINISTRATION
INCREMENTAL MOTION DRIVE SYSTEM
3,501,683
Filed May 17, 1967
4 Sheets-Sheet 1
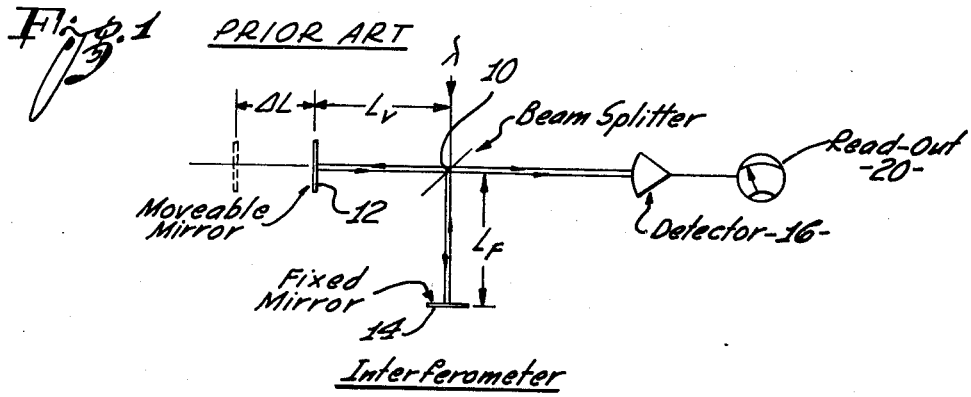
Fig. 1 PRIOR ART — Interferometer
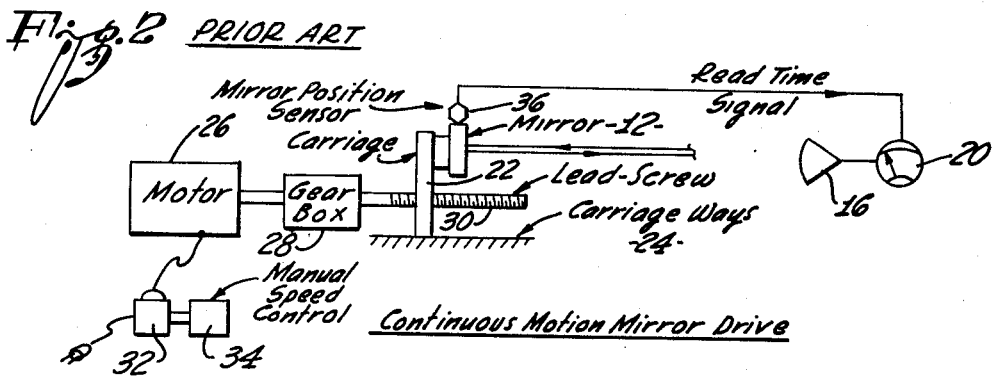
Fig. 2 PRIOR ART — Continuous Motion Mirror Drive
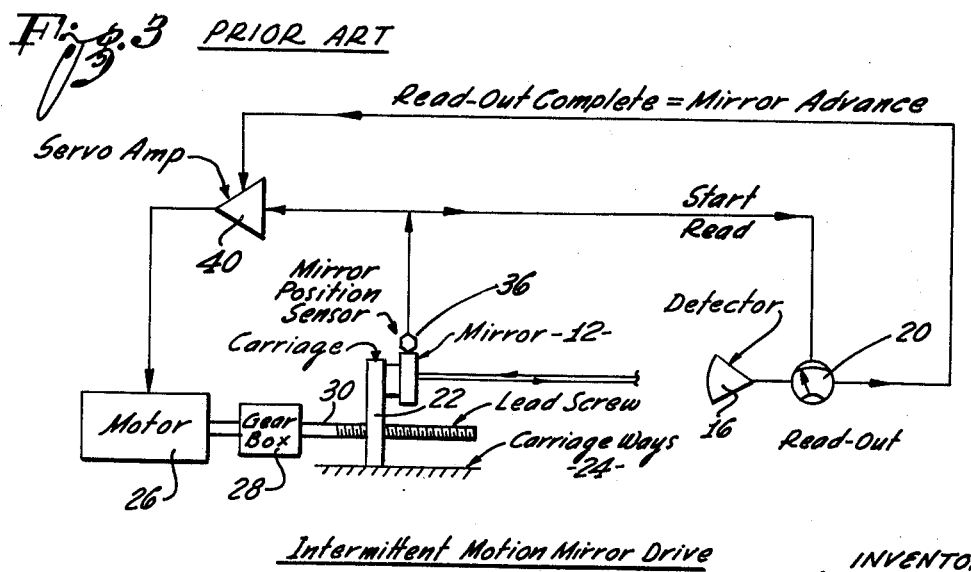
Fig. 3 PRIOR ART — Intermittent Motion Mirror Drive
INVENTOR:
John H. Morecroft
ATTORNEY

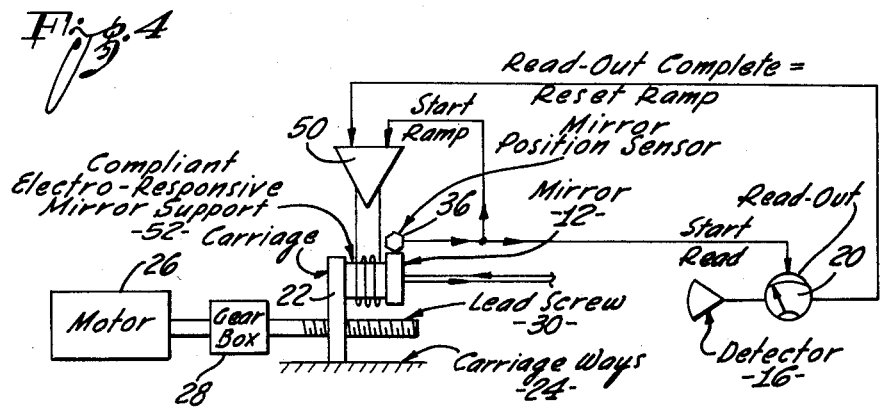
Fig. 4
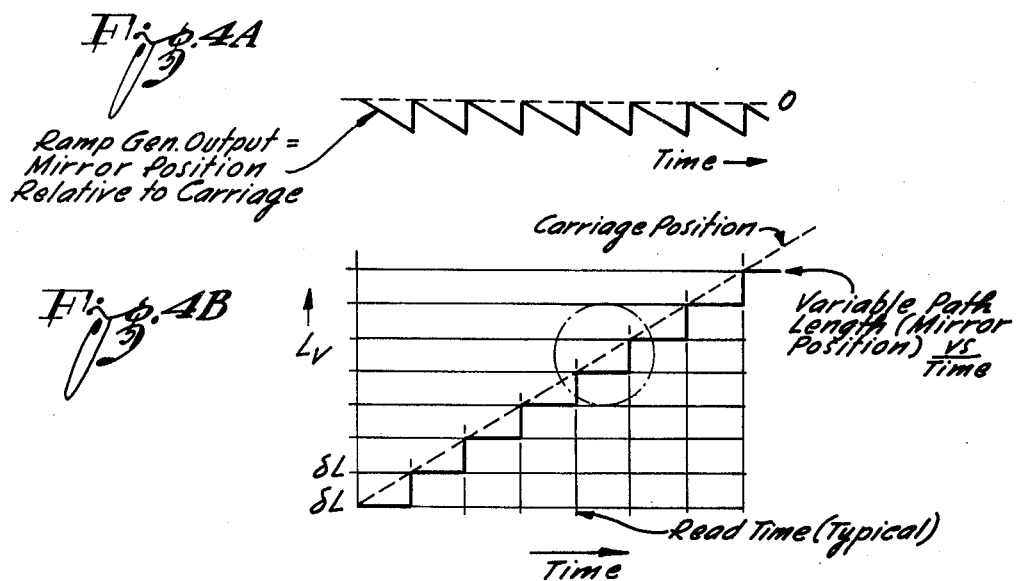
Fig. 4A
Fig. 4B
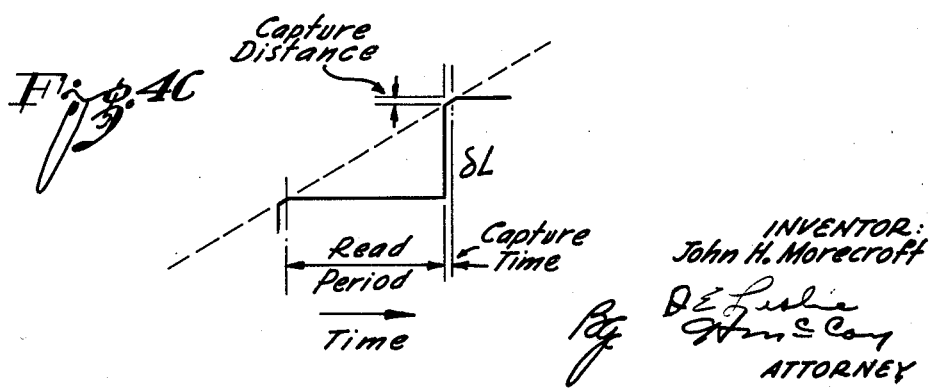
Fig. 4C
INVENTOR:
John H. Morecroft
ATTORNEY

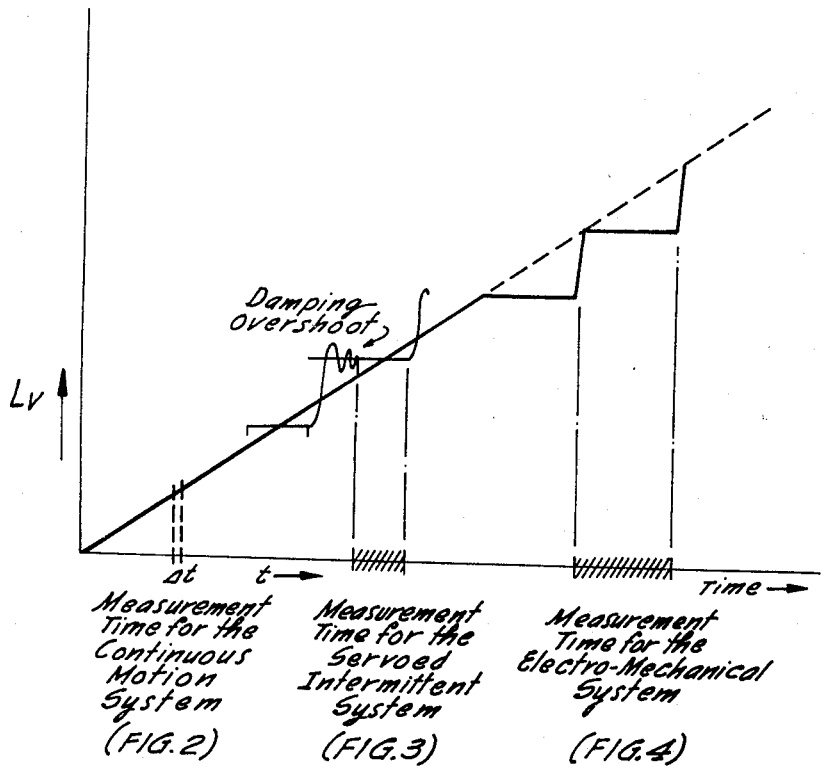

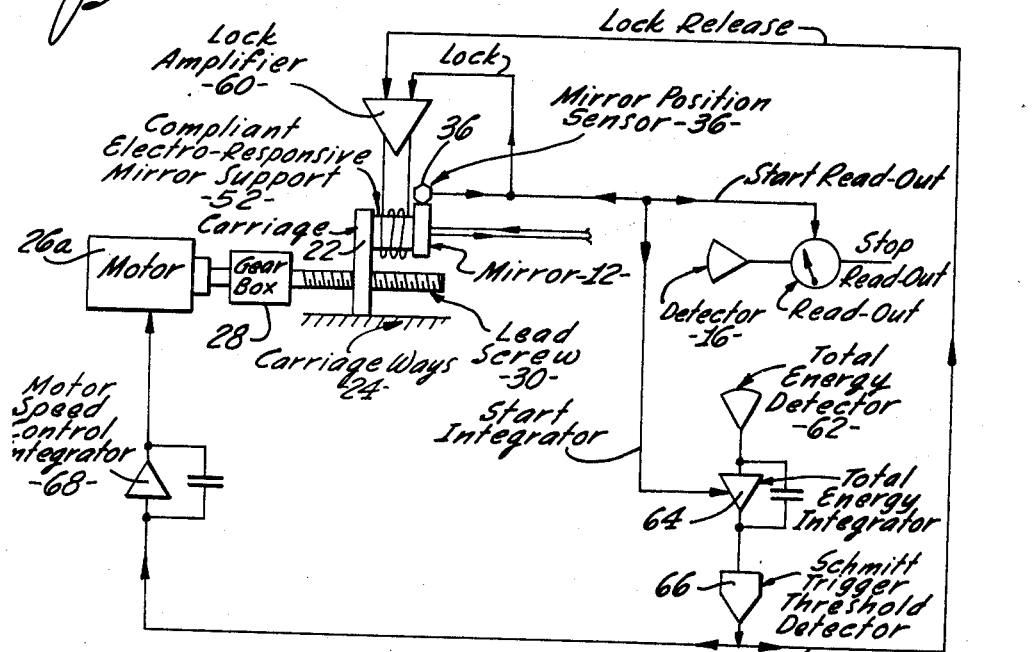
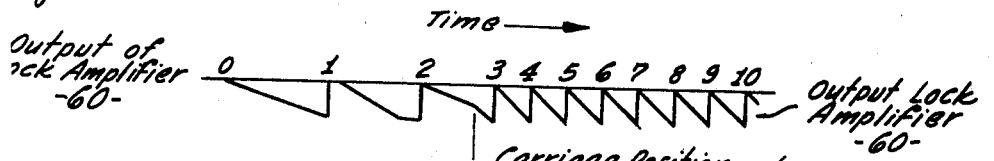
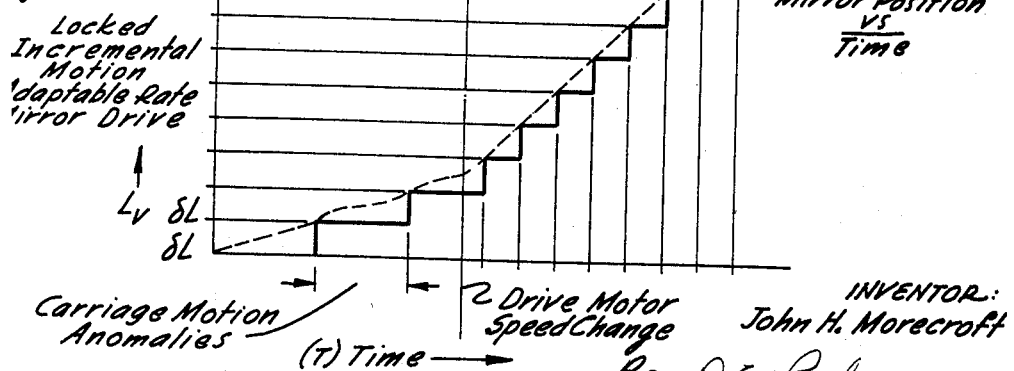

United States Patent Office 3,501,683
Patented Mar. 17, 1970

3,501,683
INCREMENTAL MOTION DRIVE SYSTEM
James E. Webb, Administrator of the National Aeronautics and Space Administration, with respect to an invention of John H. Morecroft, La Crescenta, Calif.
Filed May 17, 1967, Ser. No. 640,450
Int. Cl. G05b 11/01
U.S. Cl. 318—22  13 Claims

ABSTRACT OF THE DISCLOSURE

An incremental motion drive system wherein the driven member is subjected to two separate driving motions. The first driving motion is a continuous motion in a predetermined direction. The second driving motion is superimposed upon the first by means of an electromechanical transducer so that the motion of the driven member may be reversed, stopped or otherwise altered in accordance with a control signal transmitted to the transducer. The incremental motion drive system has particularly excellent utility when incorporated into a combination of interferometer system components for providing an improved interferometer.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 434; 42 USC 4257).

BACKGROUND OF THE INVENTION

The incremental motion drive system of the instant invention finds particular utility in the field of interferometer art. Although the drive system is not limited to use in the interfereometer art it finds particularly excellent utility in the field of techonolgy. In order to facilitate a complete and clear description and understanding of the invention the incremental motion drive system is described herein as it is incorporated into a combination of interferometer system components for providing an improved interferometer.

An interferometer well known to those familiar with the state of the interferometer art is the Michelson stellar interferometer. The Michelson stellar interferometer includes two mirrors, one a fixed positioned mirror and the other a movable mirror. The movable mirror in the Michelson interferometer is moved toward the fixed mirror in a predetermined manner so as to produce variations in the distance separating the fixed mirror from the movable mirror. Light energy emanating from a stellar body is directed by the two mirrors into a telescope and diffraction patterns are superimposed in the focal plane. During the operation of the interferometer, readings are taken when the movable mirror is positioned at varying distances from the fixed mirror. The positions of the movable mirror relative to the fixed mirror, at which readings are taken, correspond to various wavelengths throughout a selected spectral range.

Several different techniques previously have been used for adjusting the movable mirror in the Michelson stellar interferometer for obtaining various incremental positions within a selected spectral range so that useful readings may be taken and desired data thereby obtained.

One well known prior art technique includes the movement of the movable mirror in a continuous manner and at a constant rate toward the fixed mirror while discrete readings are taken at predetermined equi-spaced points in a selected spectrum without stopping the mirror during the time each measurement reading is being taken. Another known prior art technique has been the use of a servo system to control the movable mirror so that the mirror thereby may be moved incrementally from one reading position to another and the mirror stopped at each position so as to facilitate the obtaining of desired readings.

In both of the prior art techniques, the movable mirror is usually mounted on a cariage which is driven, for example, by a lead screw. In the case where the movable mirror is moved continuously, the lead screw is driven continuously. In the case where the movable mirror is moved incrementally by means of a servo drive, the lead screw is driven intermittently under the control of the servo system.

Both the continuous-motion and servo-controlled prior art drive systems are subject to certain limitations. For example, in the continous-motion system the various measurement readings must be made in extremely small intervals of time. This is done of necessity because the movable mirror continues to move during the measurement interval, and errors will result if mirror movement during the measurement interval is not small as compared with overall mirror movement for the complete operation cycle of the instrument. Since the various measurement readings must be made in extremely small intervals of time in a continuous-motion system the signal to be measured is often lost in background noise.

A limitation of the continuous-motion system is obviated in the servo-controlled type system since the movable mirror is stopped at each point at which a measurement reading is to be taken. Also, by detecting the signal by an integrating technique over a relatively large measurement interval at each reading point, noise components tends to cancel while signal components tends to accumulate so that adequate signal-noise ratios may be achieved. However, damping means are required in the servo type system in order to reduce to a minimum the problems relating to the over-travel or over-shooting of the carriage as it moves between reading positions. In addition to the over-shooting problems, other problems caused by hysteresis, inertia, friction and mechanical irregularities are also present in the servo type of drive system and in the interest of obtaining accurate and usable data these problems must be overcome in the best manner and by the best means possible. The damping requirement of the servo system is such that there must be an appreciable time interval between measurement

SUMMARY readings in order to permit the damping within the servo system to be effective. Thus the number of measurement readings which may be taken is thereby reduced and, of necessity, the effectiveness of the interferometer instrument is thereby affected.

The improved drive system of the present invention provides that the movable member, such as the movable mirror in the Michelson interferometer, may be moved in a continuous manner so that the simplicity of the continuous motion prior art drive systems may be preserved. The movable mirror, similar to the prior art structural arrangements, may be mounted on a carriage which is moved continuously by means of a lead screw, for example. The direction of travel may be set toward the fixed mirror member within the interferometer. In the practice of the present invention as applied to the interferometer art, the movable mirror is carried by an electro-mechanical transducer which, in turn, is mounted on the carriage. The application of an external electrical signal to the transducer causes the movable mirror to move in a direction opposite to the direction of continuous movement of the carriage, and at a same velocity rate, so as, for example, effectively to stop the movable mirror. Alternatively the transducer may cause the movable mirror to proceed in the direction of motion of the carriage, and at an increased speed, reversed or otherwise altered depending on the external electrical signal applied to the transducer. In this manner, a desired incremental movement of the movable mirror, such as in the servo type of prior art drive system, can be achieved in a simple and expeditious manner. The electro-mechanical transducer, for example, may be electrostatic, piezoelectric, magnetostrictive, or the like.

The improved drive system of the instant invention is capable of achieving the fundamental characteristics of the servo type prior art drive system without having the inherent complexities and limitations of the servo type drive system such as enumerated supra. Additionally the drive system of the instant invention is capable of achieving the fundamental functional characteristics of the servo type prior art drive systems with a simplicity comparable to the prior art continuous motion drive systems.

With a complexity only slightly greater than the prior art continuous motion type of drive system, the improved incremental drive system of the present invention is capable of achieving improved performance over that attainable with the servo type of prior art systems, since there is no problem of over-shooting in the drive system of the instant invention, and no requirement for the provision of suitable damping means.

Although the improved incremental drive system of the present invention finds particular utility in the interferometer art, the drive system is applicable to any instrumentation requiring highly precise and accurate positional control, particularly where resolutional precision in the micron range is required.

The improved incremental drive system of the present invention may drive the movable member linearly, for example, as will be described, or angularly if so desired. The incremental drive system of the invention finds particular utility in measuring instruments such as interferometers, as described, and in refractometers, diffractometers, scanning types of instruments, and the like.

Accordingly, an object of the invention is to provide an incremental motion drive system wherein the driven member is subjected to two separate driving motions, a first continuous driving motion in a predetermined direction and a second driving motion superimposed upon the first by means of an electromechanical transducer, for example, so that the driven member may be stopped, reversed or otherwise have its speed and direction of travel altered by means of an external electrical signal applied to the transducer, for example.

Another object of the invention is to provide for improved interferometer instrumentation, and functional performance resulting therefrom, by incorporating the incremental motion drive system into a combination of interferometer system component parts so as to provide an improved interferometer.

That these and other objects and advantages of the invention are obtained will be apparent from reference to the description of the preferred embodiments of the invention set forth herein below and to the accompanying drawings which form a part of this specification wherein:

BRIEF DESCRIPTION OF THE DRAWINGS

FIGURE 1 is a schematic diagram of the prior art Michelson type interferometer in which the improved incremental drive system of the present invention may be incorporated;

FIGURE 2 is a schematic representation of the prior art type of continuous motion drive system used, for example, in the interferometer shown in FIGURE 1;

FIGURE 3 is a schematic representation of the prior art servo type intermittent drive system which, likewise, may be utilized in the interferometer shown in FIGURE 1 in place of the continuous motion driven system shown in FIGURE 2;

FIGURE 4 is a schematic representation of an improved incremental motion drive system incorporating the concepts of the present invention, and which likewise may be utilized in the interferometer shown in FIGURE 1;

FIGURES 4A–4C are curves useful in explaining the operation of the system shown in FIGURE 4;

FIGURE 5 is a series of curves representative of the effectiveness of the three types of systems shown schematically in FIGURES 2, 3 and 4;

FIGURE 6 is a schematic diagram of the incremental motion drive system of the invention and particularly illustrative of a lock-in feature of the drive system; and FIGURES 7 and 8 are curves useful in explaining the operation of the system shown in FIGURE 6.

DESCRIPTION OF PRESENTLY PREFERRED EMBODIMENTS

In the Michelson stellar interferometer, shown schematically in FIGURE 1, light from a distant source $\lambda$, such as from a star, for example, is directed to a beam splitter 10. A portion of the light from the beam splitter is reflected back to a movable mirror 12, and a second portion of the light passes through the beam splitter to a fixed mirror 14. The light reflected from the movable mirror 12 passes through the beam splitter to a detector 16, and light reflected from the fixed mirror 14 is reflected by the beam splitter and passes to the detector 16.

The fixed mirror is shown as being placed a distance $L_F$ from the optical axis of the instrument, and the movable mirror is shown as being displaced a distance $L_V$ from the optical axis of the incoming light. As the movable mirror 12 is moved through successive increments $\delta L$, different readings are established by the detector 16, as indicated by the read-out device 20.

As is well known in the interferometer art, in order to obtain desired measurement readings, it is necessary that the movable mirror be moved in successively equal increments through a selected portion of the spectrum, and that measurement readings be taken at the end of each increment of movement. The movements of the movable mirror must be precise and accurate, and in the micron range.

Usually, a relatively large number of measurements are required for spectrum analysis of the incident radiation, so that some form of automatic drive system for the movable mirror 12 therefore is required. As indicated above, one type of drive system developed in the prior art, and as shown in FIGURE 2, is a continuous drive system wherein measurement readings are taken periodically through the spectrum as the movable mirror 12 continues to be moved by the drive system.

In the system of FIGURE 2, the movable mirror 12 is mounted on a carriage 22, which, in turn, is movable along carriage ways 24. An electric motor 26 is mechanically coupled through a gear box 28 to a lead screw 30. The lead screw passes through the carriage 22. Rotation of the lead screw causes the carriage 22, and the mirror 12, to move along the carriage ways 24 toward the beam splitter 10 shown in FIGURE 1 and, optically, toward the fixed mirror 14 so that the desired operational results for the interferometer may be achieved.

The electric motor 26 may be energized from any appropriate source through a control box 32, for example, and its speed may be set by a manual speed control 34, for example, to any predetermined fixed level.

A mirror position sensor 36 is mounted on the movable mirror 12. The sensor provides a control signal which is transmitted to the read-out 20 so that measurement readings may be taken at predetermined positions of the mirror, as it moves continually along its predetermined path of travel. As is well known in the art, the sensor 36 produces an output signal which decreases in amplitude to a null each time a measurement position is reached, and then increases in amplitude to a maximum until the next measurement position is approached.

Although for simplicity the sensor 36 is shown as affixed to the movable mirror 12, in practice more precise methods are required which frequently employ fringe detection in association with the actual interferometer transmission paths.

A second type of prior art mechanism for controlling the movable mirror 12 in the interferometer of FIGURE 1 is shown in FIGURE 3. In FIGURE 3, components similar to those shown in FIGURES 1 or 2 are designated by the same numerals. In the implementation of FIGURE 3 a servo controlled intermittent incremental motion of the movable mirror is provided, so that the movable mirror may be brought to a stop at each successive measurement position at which measurement readings are to be taken.

In the system of FIGURE 3 the position of the movable mirror is shifted successively between reading positions. The mirror is allowed to come to rest at each position. Thus, it thereby is possible to extend each reading interval by a significant amount so as to provide for improved signal-noise ratios for purposes set forth hereinabove.

In the system of FIGURE 3 the motor 26 is controlled by the output of a servo amplifier 40. A signal derived from the sensor 36 is applied to the servo amplifier 40 so as thereby to cause the motor 26 to stop each time the movable mirror 12 reaches a predetermined reading position.

After the read-out has been completed by the read-out device 20 and after a pre-established time interval, a signal derived from the read-out device is applied to the servo amplifier 40 and the motor 26 is caused to be energized so as thereby to move the carriage 22 and the mirror 12 incrementally to a successive measuring position. The output from the sensor 36 is also applied to the read-out device 20, so that the read-out device thereby may be conditioned to make a reading only when the sensor indicates that the carriage has been moved to one of its predetermined reading positions.

As indicated hereinbefore, the use of the servo controlled drive system shown in FIGURE 3 has certain advantages over the continuous motion drive system shown in FIGURE 2 in that the reading intervals can be extended so that a more accurate reading, and one less susceptible to noise, may be made. However, as also previously indicated, the servo type of drive system shown in FIGURE 3 has limitations because of the necessity for damping, and also because of the problems related to inertia, mass, hysteresis, mechanical imperfections and the like.

The incremental motion drive system of the present invention, as shown in the embodiment of FIGURE 4, retains the simplicity of the continuous drive system of FIGURE 2, for providing a continuous driving motion for the carriage 22. Of course, other means may be used for providing a continuous driving motion for the carriage. Morover, the driving speed for the carriage may be varied, so long as the opposing slope of the ramp controlling the movable member, to be described more fully herein below, is equal and opposite to the drive speed.

In the system shown in FIGURE 4, and in accordance with the concepts of the invention, the mirror position sensor 36 generates a signal each time the movable mirror 12 reaches a predetermined measuring position. This signal is applied to a ramp generator 50, which may be of any known type, and which is constructed so that a ramp signal is generated at its output, the ramp signal being initiated upon the receipt of a signal from the sensor 36. The ramp signal continues until a reset signal indicating that the particular reading is completed is derived from the read-out 20 and is applied to the ramp generator to reset the circuit.

The output of the ramp generator 50 is coupled to the control coil, for example, of an electromechanical transducer 52 of any desired type. As shown in FIGURE 4, the transducer is mounted on the carriage 22 and the movable mirror 12 is mounted on the transducer. The transducer 52, in response to a signal applied thereto from the ramp generator 50 has the ability to move the position of the mirror 12 relative to the carriage 22, and, for example, in a direction opposite to the direction of continuous movement of the carriage.

It is recognized that the electromechanical transducer may be any one of a selected variety of transducer types. For example, a solenoid type transducer may be used. Also a moving coil compliance system such as employed in a loudspeaker driver, or any other suitable type of electromechanical transducer may be used. A most desirable and appropriate form of transducer to be used within the drive system as shown in FIGURE 4 would be a magnetostrictive type of transducer device. The usual magnetostrictive rod has inherent high rigidity and is especially suited for maintaining a movable mirror 12, for example, precisely in alignment at all times and particularly during the time the mirror is in motion.

The ramp generator 50 shown in FIGURE 4 produces a signal such as shown in FIGURE 4A. The signal from the ramp generator is applied to the transducer 52. The curve of FIGURE 4B shows the movement ($L_V$) of the movable mirror 12 as a function of time. It will be seen that as the ramp voltage of FIGURE 4A is increasing in the negative sense the slope of the ramp signal is equal and opposite to the slope of the movement of the carriage so that the movable mirror effectively is stopped relative to the fixed mirror, and for a predetermined interval of time.

At the end of any particular read-out interval the signal from the read-out device 20 resets the ramp generator 50 so that the ramp signal quickly returns in a positive direction towards the zero axis, as shown in FIGURE 4A. Thus, the movable mirror thereby effectively is caused to be moved in the same direction as the carriage, so that the movable mirror then is moved to the position it would have reached if it previously had not had its motion reversed, as shown in the curve of FIGURE 4B. In this manner, the control of the mirror 12 is such that it can be moved incrementally along the optical axis, in increments $\delta L$, and in an intermittent manner, thus permitting appropriate read-out readings to be made.

It will be appreciated, therefore, that incremental motion is achieved in the system of the invention by having two movements applied simultaneously to the movable member 12. The initial drive is a continuous motion imparted to the carriage 22, for example, from the constant speed motor 26 through the lead screw 30. The secondary drive is that supplied by the transducer 52 which is mounted on the carriage 22. Since the position of the movable member 12 is dependent upon the combined effect of the two movements, it therefore is possible effectively to hold the member 12 stationary, as shown by the curve of FIGURE 4B, by driving the member 12 at the same speed as the carriage, but in an opposite direction.

As indicated hereinabove, in order to perform the stopping function of the mirror 12 repeatedly, it is necessary that the mirror 12 be restored to its normal position relative to the carriage following each read-out interval. Since the maximum motion velocity obtainable by the transducer 52 is extremely high, as compared with the motion of the carriage, the time requirement for restoration of a normal mirror-carriage realtionship is negligible in comparison with the total operating time of the system.

Three parameters define the operation of the ramp generator 50. These parameters are the slope of the ramp, the start time, as controlled by the signal derived from the sensor 36, and the stop time, as controlled by the signal derived from the read-out 20. The reciprocal relationship between the motion of the carriage 22 and the slope of the ramp signal from the generator 50 has been noted hereinabove.

The start of the ramp occurs when the mirror 12 reaches a measurement position as indicated by the sensor 36. Simultaneously, with the start of the ramp the sensor applies a signal to the read-out device 20 so that the read-out operation may be initiated. The end of the ramp may occur at any time prior to the arrival of the carriage at the next successive measurement position. The end of the ramp is controlled by the signal from the read-out device 20 which indicates the termination of the read-out operation.

An enlarged portion of the mirror motion plot is shown in FIGURE 4C, which illustrates the available time for the read-out function, as a function of the separation between adjacent measurement positions. As illustrated in FIGURE 4C, the read-out period must be slight shorter than the interval between adjacent measurement reading positions, so as to permit a minimum "capture time" and a minimum "capture distance." The capture time and capture distance, as shown in FIGURE 4C, of course, are much less than the corresponding settling times required in the servo type of system shown in FIGURE 3.

The curve of FIGURE 5 shows a comparison of the three types of systems described above. An examination of the curve of FIGURE 5 will reveal that the prior art continuous motion system of FIGURE 2 requires, for example, an extremely short measurement interval Δt. The servo type system of FIGURE 3 conversely is such that the measurement interval can be expanded. However, due to the damping, over-travel, over-shoot characteristics of the servo system of FIGURE 3 a relatively wide interval is required between successive measuring positions which is not the case with the incremental system of the present invention.

It will be observed that the system of FIGURE 4, which incorporates the concepts of the present invention, produces a desired incremental motion of the mirror 12, so that the interferometer may make a desired series of measurements through a predetermined spectrum. Also, the system of FIGURE 4 is essentially simpler than the prior art servo system of FIGURE 3, yet the system of FIGURE 4 permits the mirror to be effectively stopped for each measurement. Also, the system of FIGURE 4 provides for a sufficient length of time for measurement to permit the signal derived at each position to be integrated over a time interval sufficient to minimize the random noise distortion which plays a dominant factor in the continuous motion type of prior art interferometer system.

The embodiment of the invention represented by the system shown in FIGURE 4 retains the simplicity of the prior art continuous motion system shown in FIGURE 2, and achieves the stop action of the stervo type of prior art system without the attendant problems of inertia, mass, damping, hysteresis, and the like. When the concept of the present invention is applied to the field of interferometers, as shown, for example, schematically in the particular embodiment of FIGURE 4, a desired intermittent mirror motion is achieved, providing for particularly accurate and effectively useful interferometer readings free of the attendant problems prevalent in the prior art type systems.

The electro-responsive mirror support 52 of the system of FIGURE 4 may take the form of any suitable type of electromechanical transducer. For example, a solenoid, moving coil driven compliance system similar to those used in loudspeaker drives, piezoelectric devices, magnetostrictive devices, or others may be used. As indicated above a most promising form of the transducer element is that of the magnetostrictive device. The inherently high rigidity of magnetostriction devices render such a device an ideal element for maintaining optical mirror alignment during the operation of the system. Moreover, if desired, the lead screw drive of the carriage 22 and its corresponding drive elements may be replaced by a magnetostrictive device which acts in conjunction with the electro-responsive mirror support 52 to drive the mirror 12 through the desired spectrum.

It will be appreciated that the system of FIGURE 4 pre-supposes that the motion of the carriage 22, as driven by the lead screw 30, will be linear at all times, and that the ramp generated by the ramp generator 50, likewise, will be linear and equal and opposite to the linear motion of the carriage itself.

The desired incremental motion of the mirror 12 is achieved by applying two simultaneous driving forces to the mirror. The primary drive is the continuous motion imparted to the carriage 22 by the lead screw 30 which, in turn, is driven at a constant speed by the constant speed motor 26. The secondary drive is supplied by the electro-responsive support 52, in response to the ramp from the generator 50.

Since the resultant position of the mirror 12 with respect to the detector 16 is the combined effect of the two drives, it is possible to hold the mirror stationary only when the mirror support 52 is driven at the same speed as the carriage 22 and in the opposite direction. Also, to perform the function repeatedly, it is necessary that the mirror 12 be restored to its normal spatial relationship with the carriage 22 at the end of each of its stopped intervals. However, with most of the known types of electromechanical transducers the maximum velocity obtainable is extremely high as compared with the speed of the carriage 22, so that the time required to restore the normal mirror-carriage relationship is a negligible portion of the operating time for the system, as shown, for example, in FIGURE 4C.

The system of FIGURE 6 is generally similar to the system of FIGURE 4. However, certain automatic controls are incorporated into the system of FIGURE 6 so that it is capable of compensating for variations in the speed of the lead screw 30, and other components of the system, without affecting the accuracy of the system.

The system of FIGURE 6 additionally incorporates further automatic control to provide a variable speed drive for the carriage 22 so that the length of any observation period may be adjusted to be no longer than normally necessary, thereby increasing the speed and efficiency by which a set of readings may be taken. The components of the system shown in FIGURE 6 which are similar to those of FIGURE 4 are indicated by the same numbers.

The system of FIGURE 6 includes an amplifier 60 which is designated a "lock amplifier," and which may be any suitable type of phase sensitive power amplifier. As the mirror 12 approaches a position at which a measurement is to be made the output of the mirror position sensor 36, previously indicated as being well known in the art, drops to a null value. Any tendency for the mirror to advance beyond the null point causes the sensor to generate a signal of increasing amplitude. This signal is amplified by the lock amplifier 60, and the signal generates an equal and opposite signal in the coil of the electro-responsive mirror support 52.

The signal generated by the amplifier 60 is shown in FIGURE 7. It will be appreciated that regardless of any slight variations in the speed of the carriage 22 any tendency of the carriage to be driven beyond a null point, as designated by the sensor 36, causes the lock amplifier 60 to apply a signal to the mirror support 52 of the exact slope to compensate for the forward motion tendency of the carriage 22 and to hold the mirror 12 in an effectively stopped position with respect to the detector 16.

The time required to make a precise measurement at any particular mirror position in the spectrum depends upon the amount of light available from the source being measured. For example, if the light available is at a relatively high intensity, the measurement interval can be relatively short without losing the signal in the background noise. Conversely, when the intensity of light from the source is relatively low the interval must be greater so that appropriate integration of the signal over the measurement interval can be made to distinguish it from the random noise.

The system of FIGURE 6 automatically adjusts the speed of the motor, designated 26a, so that the measurement intervals will be long enough, but no longer, than that required to make a proper measurement, as determined by the intensity of light available from the source under measurement. Thus, the mirror will be driven throughout the entire measurement interval at the maximum efficient speed for any measurement interval.

A total energy detector 62 is included in the system shown in FIGURE 6. Total energy detectors are well known to the interferometer art and as is well known in the art they measure the total energy available from the energy source being measured. The output from the total energy detector is applied to an integrator 64 which may be of any usual construction. The integration cycle in the integrator 64 is not commenced until a null signal is derived from the mirror sensor 36 thereby designating that a measurement position has been reached.

It will be appreciated that the rate at which the integrated output from the integrator 64 reaches a predetermined amplitude thereshold, subsequent to the start of any particular integration cycle by the signal from the sensor 36, depends upon the amplitude level of the output from the total energy detector 62.

A threshold detector 66, which may be in the form of a Schmitt trigger, for example, is coupled to the output of the integrator 64. A pulse output is derived from the Schmitt trigger whenever the output from the integrator 64 exceeds the predetermined threshold. The circuit described above provides that the Schmitt trigger 66 will develop a pulse output at a predetermined interval after a measurement position has been reached, the length of the interval being determined by the energy intensity from the source being measured.

The pulse output from the threshold detector 66 is applied to the lock amplifier 60 where it is utilized by any appropriate known circut so as to quickly reduce the output of the lock amplifier 60 back to the reference level. It is understood, for example, that pulses from the threshold detector 66 are applied to the lock amplifier 60 at points 0, 1, 2, 3, 4, 5, 6, 7, 8, 9, 10 in the curve of FIGURE 7.

The output from the Schmitt trigger threshold detector 66 is also applied to a motor speed control integrator 68, so that the speed of the motor 26a is determined by the repetition rate of the pulses from the threshold detector. It will be appreciated that the higher the intensity of radiation from the source being measured, the higher the pulse repetition rate from the Schmitt trigger threshold detector 66, and, therefore, the higher the speed of the motor 26a, as shown by the curve of FIGURE 8. In this way, the speed of the motor 26a is increased or decreased, depending upon the intensity from the source being measured, so that optimum speed for proper measurements is maintained at all times.

It is to be understood that although the improved incremental drive system of the invention is shown and described herein as utilized in the interferometer art, this drive system has general application wherever effectively precise incremental control of a driven member is desired.

It is appreciated, of course, that while particular embodiments of the invention have been shown and described, modifications may be made. It is intended that the following claims cover all such modifications as fall within the permissible range of equivalents in accordance with the scope and spirit of the invention.

What is claimed is:

1. A drive system including: a carriage; a first drive means coupled to said carirage for driving said carriage along a predetermined path; a driven member, said driven member being mounted with respect to said carriage so as to be driven therewith; compliant electro-responsive means coupled to said driven member; and electrical control circuit means responsive to the position and velocity of said carriage and electrically coupled to said electro-responsive means for introducing an electrical output signal thereto effectively to move said driven member with respect to said carriage to control the velocity of said driven member.

2. The drive system defined in claim 1 in which said electro-responsive means moves said driven member along said predetermined path in a direction opposite to the direction of movement of said carriage so as thereby effectively to stop the movement of said driven member.

3. The drive system defined in claim 1 in which said first drive means imparts continuous motion to said carriage, and in which said electro-responsive means drives said driven member at an equal and opopsite rate to said carriage during preselected periods for resultant incremental movement of said driven member.

4. The drive system defined in claim 1 and which includes a sensor coupled to said driven member for producing an electrical control signal indicating when said driven member has reached a pre-established position, and in which said control circuit means is coupled to said sensor and is responsive to said control signal for producing said output signal.

5. The drive system defined in claim 4 in which said control circuit means includes a ramp generator for generating said output signal, said output signal being in the form of a ramp signal initiated in response to said control signal but having a slope independent of said control signal.

6. The drive system defined in claim 4 in which said control circuit means includes an amplifier for generating said output signal, said output signal having a waveform dependent upon said control signal.

7. The drive system defined in claim 1 in which said first drive means includes a lead screw and an electric drive motor driving said lead screw.

8. The drive system defined in claim 7 in which said drive motor drives said lead screw at a constant speed.

9. The drive system defined in claim 1 in which said first drive means includes an electric drive motor, and which includes further circuit means for controlling the speed of said drive motor.

10. The drive system defined in claim 1 in which said driven member includes a radiation detector means for detecting radiation from a source distant from said detector means and which further includes a sensor coupled to said radiation directing means for producing an electrical control signal indicating when said radiation directing means has reached a pre-established position, and in which said control circuit means is coupled to said sensor and includes an amplifier for generating said output signal in response to the control signal.

11. The drive system defined in claim 10 and which includes radiation intensity responsive means responsive to said radiation detector means for generating a further electrical signal having an amplitude dependent upon the intensity of the radiation from said source; and integrating circuit means coupled to said radiation intensity responsive means for applying a cut-off signal to said amplifier a predetermined time interval after said radiation directing means has reached said predetermined position as determined by the amplitude of said signal from said radiation intensity responsive means.

12. The drive system defined in claim 10 and which includes radiation intensity responsive means responsive to said radiation detector means for generating a further electrical signal having an amplitude dependent upon the intensity of radiation from said source; and which includes further circuit means coupled to said first drive means and to said radiation intensity responsive means for controlling the speed of said carriage in accordance with the amplitude of said signal from said radiation intensity responsive means.

13. The drive system defined in claim 12 in which said first drive means includes a lead screw and an electric drive motor for said screw.

References Cited

UNITED STATES PATENTS

| 3,104,349 | 9/1963 | Stevens | 318—22 |
| 3,188,546 | 6/1965 | Dawkins | 318—286 |

BENJAMIN DOBECK, Primary Examiner

U.S. Cl. X.R.

318—38